US012105969B2

(12) United States Patent
Sun et al.

(10) Patent No.: US 12,105,969 B2
(45) Date of Patent: Oct. 1, 2024

(54) METHOD, DEVICE, AND COMPUTER PROGRAM PRODUCT FOR STORAGE

(71) Applicant: Dell Products L.P., Round Rock, TX (US)

(72) Inventors: Heyang Sun, Shanghai (CN); Wesley Wei Sun, Shanghai (CN); Xiao Le Shang, Shanghai (CN); Tianbo Zhang, Shanghai (CN); Jingyi Wang, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 107 days.

(21) Appl. No.: 18/066,240

(22) Filed: Dec. 14, 2022

(65) Prior Publication Data

US 2024/0134544 A1 Apr. 25, 2024
US 2024/0231652 A9 Jul. 11, 2024

(30) Foreign Application Priority Data

Oct. 21, 2022 (CN) .......................... 202211297098.2

(51) Int. Cl.
*G06F 3/06* (2006.01)
*G06F 12/0804* (2016.01)
(52) U.S. Cl.
CPC .......... *G06F 3/0631* (2013.01); *G06F 3/0607* (2013.01); *G06F 3/0673* (2013.01); *G06F 12/0804* (2013.01); *G06F 2212/401* (2013.01)

(58) Field of Classification Search
None
See application file for complete search history.

(56) References Cited

U.S. PATENT DOCUMENTS

| | | | |
|---|---|---|---|
| 2020/0034254 A1* | 1/2020 | Natanzon | G06F 9/455 |
| 2021/0048995 A1* | 2/2021 | Myers | G06F 8/60 |
| 2023/0115261 A1* | 4/2023 | Xiao | G06F 9/45558 718/104 |
| 2023/0259409 A1* | 8/2023 | Shi | G06F 9/5077 718/104 |
| 2024/0020146 A1* | 1/2024 | Vijayvargiya | G06F 9/455 |

* cited by examiner

*Primary Examiner* — Yaima Rigol
(74) *Attorney, Agent, or Firm* — Amin, Turocy & Watson, LLP

(57) ABSTRACT

Storage processes are described. For instance, dumping of cache data in a memory table at a source directory table partition in a source container group is stopped in response to receiving a close signal. A notification for creating a target directory table partition is sent to a target container group, the notification including a checkpoint at the source directory table partition. The cache data in the memory table is sent to the target container group, and the source container group is closed in response to a determination that an ownership of the target directory table partition is updated to the target container group. A rescheduling and/or upgrading solution is thus proposed for a source container group, so that the source container group is still in a service state during the rescheduling and/or upgrading solution, which improves the performance of storage services and reduces the data unavailable time.

20 Claims, 7 Drawing Sheets

METHOD, DEVICE, AND COMPUTER PROGRAM PRODUCT FOR STORAGE

RELATED APPLICATION

The present application claims the benefit of priority to Chinese Patent Application No. 202211297098.2, filed on Oct. 21, 2022, which application is hereby incorporated into the present application by reference herein in its entirety.

TECHNICAL FIELD

Embodiments of the present disclosure generally relate to the field of computer technologies, and, more specifically, to a method, a device, and a computer program product for storage.

BACKGROUND

A directory table (DT) service stores various types of metadata. The directory table service has predefined directory table partitions, and the directory table partitions are partitioned by a consistent hash process and evenly distributed on cluster nodes. Separate directory table partitions are implemented through a custom log structure merge (LSM) tree.

By introducing a container service choreography tool (for example, kubernetes), the directory table partitions are distributed among service container groups (PODs). By managing the container group through the container service choreography tool, the container group is rescheduled and/or upgraded. During the rescheduling and/or upgrade of the container group, migration of directory table partitions will cause a storage service to be temporarily unavailable until the rescheduling and/or upgrade is completed.

SUMMARY

Embodiments of the present disclosure provide a method, a device, and a computer program product for storage.

In one example embodiment of the present disclosure, a method for storage is provided. The method includes: stopping dumping of cache data in a memory table at a source directory table partition in a source container group in response to receiving a close signal; sending a notification for creating a target directory table partition to a target container group, the notification including a checkpoint at the source directory table partition; sending the cache data in the memory table to the target container group; and closing the source container group in response to a determination that an ownership of the target directory table partition is updated to the target container group.

In another example embodiment of the present disclosure, an electronic device is provided. The device includes a processing unit and a memory, where the memory is coupled to the processing unit and stores instructions. The instructions, when executed by the processing unit, perform the following actions: stopping dumping of cache data in a memory table at a source directory table partition in a source container group in response to receiving a close signal; sending a notification for creating a target directory table partition to a target container group, the notification including a checkpoint at the source directory table partition; sending the cache data in the memory table to the target container group; and closing the source container group in response to a determination that an ownership of the target directory table partition is updated to the target container group.

In still another example embodiment of the present disclosure, a computer program product is provided. The computer program product is tangibly stored in a non-transitory computer-readable medium and contains computer-executable instructions. The computer-executable instructions, when executed, cause a computer to perform a method or process according to the embodiments of the present disclosure.

This Summary part is provided to introduce the selection of concepts in a simplified form, which will be further described in the Detailed Description below. This Summary part is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
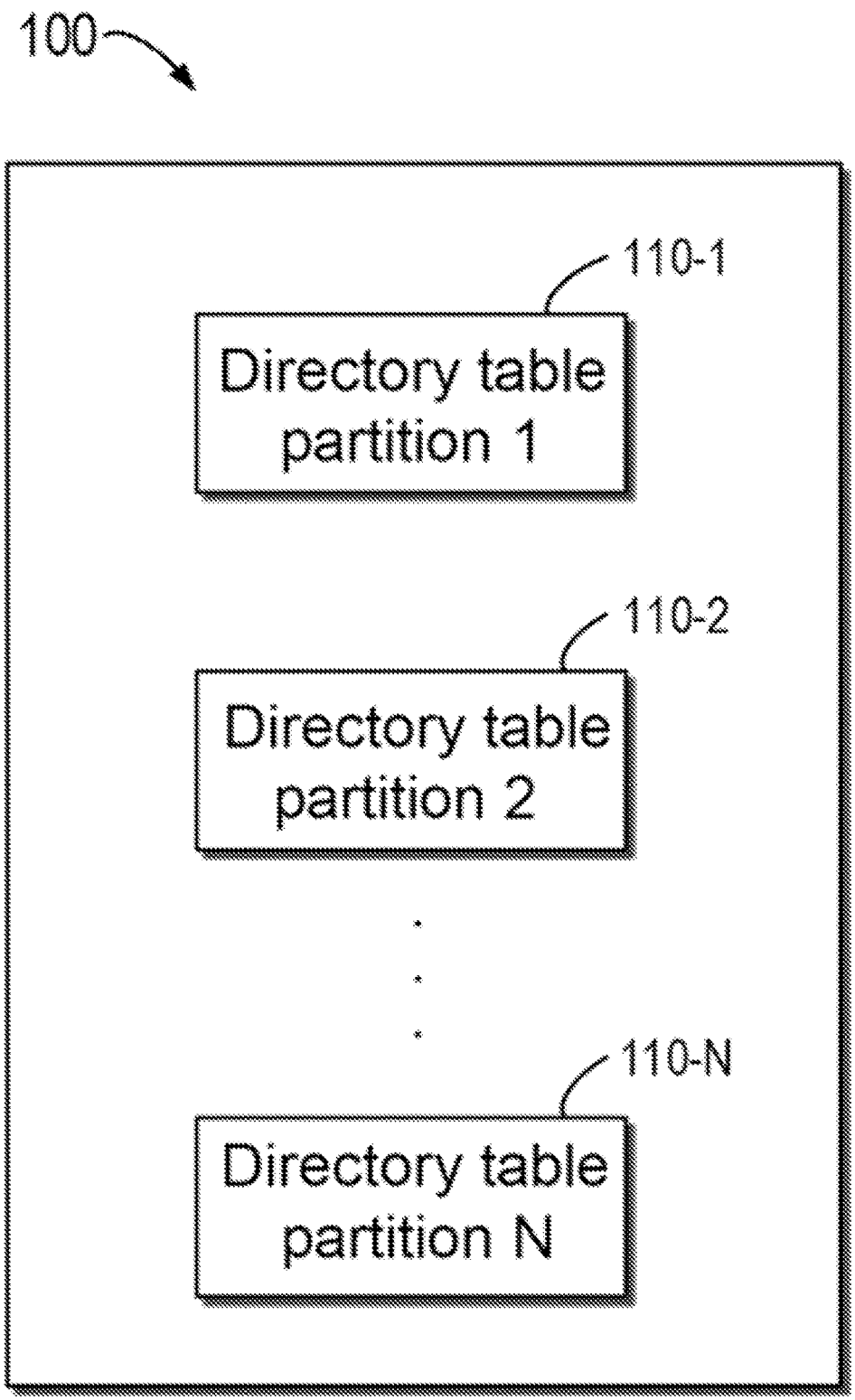
FIG. 1 shows a schematic diagram of an example container group according to an embodiment of the present disclosure.

Example embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

In a traditional storage service, the storage service will be interrupted for a long time during container group rescheduling and/or upgrading, that is, a long period of data unavailability. On the one hand, a source container group of the container group to be closed will enter a maintenance mode, and a directory table partition will perform a forced dumping process, which will take a long time. When the directory table partition is moved to a newly created target container group, it will take a long time for the directory table partition to recover a log from the latest checkpoint.

On the other hand, when a common container service choreography tool (for example, kubernetes) checks a ready state of the target container group, it not only reports that the target container group is ready when all directory table partitions of the target container group are ready, but further reports that the target container group is ready when the target container group does not contain any directory table partition. This will cause the target container group to report to the container service choreography tool that it is ready when it does not contain any directory table partition, and the corresponding source container group will be deleted, resulting in the unavailability of the corresponding directory table service.

To this end, the embodiments of the present disclosure propose a new solution of a storage service for container group rescheduling and/or upgrading. According to the embodiments of the present disclosure, the storage service interruption time during container group rescheduling and/or upgrading can be reduced, thereby improving the storage performance, and reducing the data unavailable time.

In addition, according to some embodiments of the present disclosure, an improved container group ready state detection is further proposed, which can realize reporting of readiness of the target container group only when all directory table partitions of the target container group are ready.

It should be understood that although some embodiments of the present disclosure use kubernetes (i.e., K8S) as a container service choreography tool, any other container service choreography tool can be used in combination with the embodiments of the present disclosure.

The basic principles and some example implementations of the present disclosure are illustrated below with reference to FIG. 1 to FIG. 6. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of container group 100 according to an embodiment of the present disclosure. As shown in FIG. 1, container group 100 includes directory table partitions 110-1 to 110-N. The directory table partitions provide data storage and query services. The container group implements management of the directory table partitions. It should be understood that there will be a plurality of container groups in the storage service. A container service choreography tool choreographs the container groups so that the directory table partitions are evenly distributed on the container groups.

During the rescheduling and/or upgrading of the container group, all directory table partitions on the source container group need to be migrated to the target container group. The directory table partitions are partitioned by a consistent hash process. During the rescheduling and/or upgrading of the container group, rescheduling and/or upgrading of a plurality of container groups will be involved. For example, in sample container service choreography tool K8S, a POD, as a managed container group, contains a plurality of directory table partitions. During the rescheduling and/or upgrading of the container group, all directory table partitions on the source container group need to be migrated to the target container group.

Figure 2:
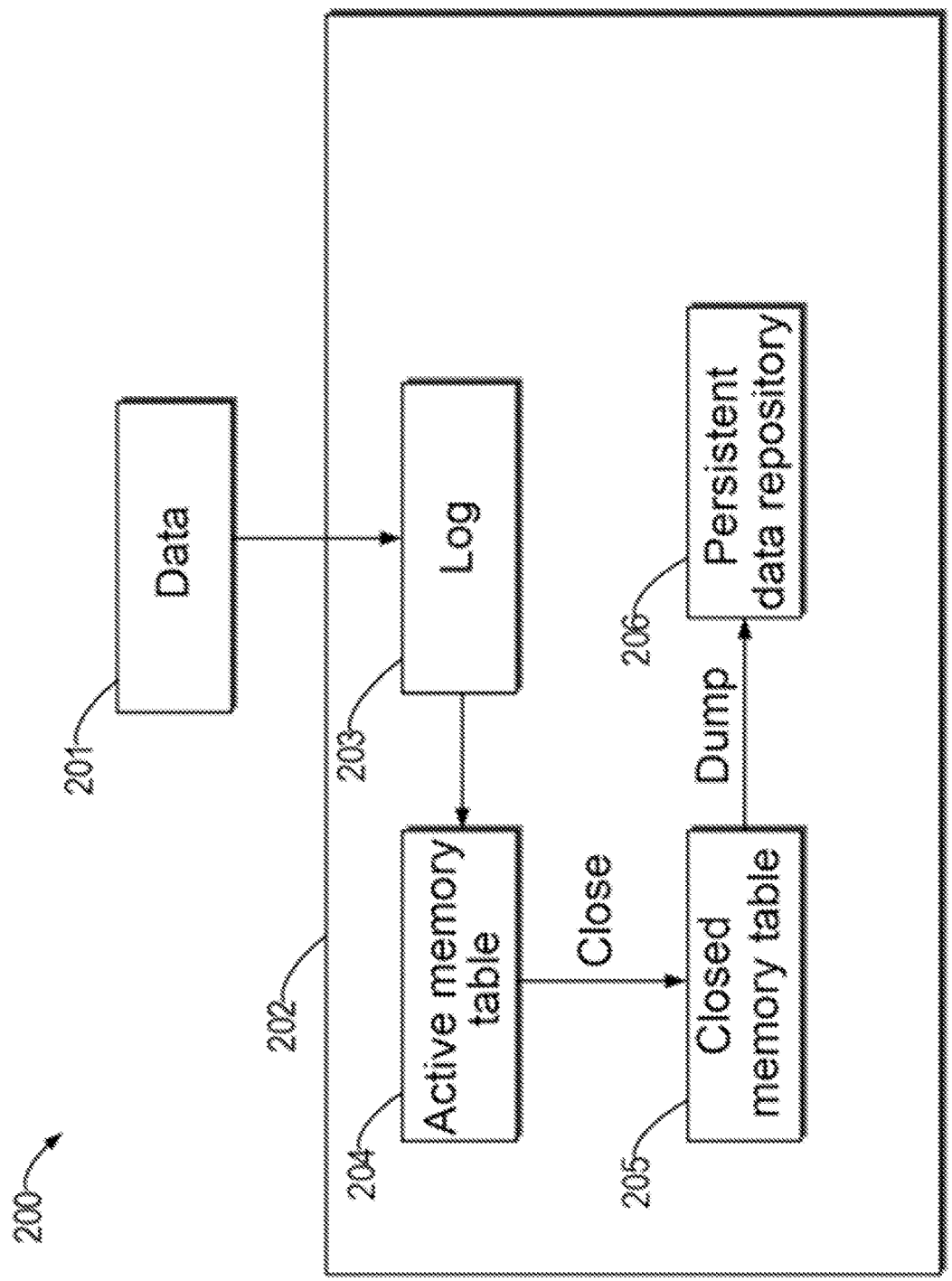
FIG. 2 shows a schematic diagram of storage of an example directory table partition according to an embodiment of the present disclosure.

FIG. 2 shows a schematic diagram of storage of an example directory table partition according to an embodiment of the present disclosure. As shown in FIG. 2, directory table partition 202 includes log 203, active memory table 204, closed memory table 205, and persistent data repository 206. Log 203 includes information about operating a directory table partition, and this part of information will be persisted to the storage device. During data writing, the data is first written to active memory table 204. When the amount of data reaches a certain condition, cache data in active memory table 204 is closed, placed in closed memory table 205, and then stored in the persistent data repository through dumping.

Figure 3:
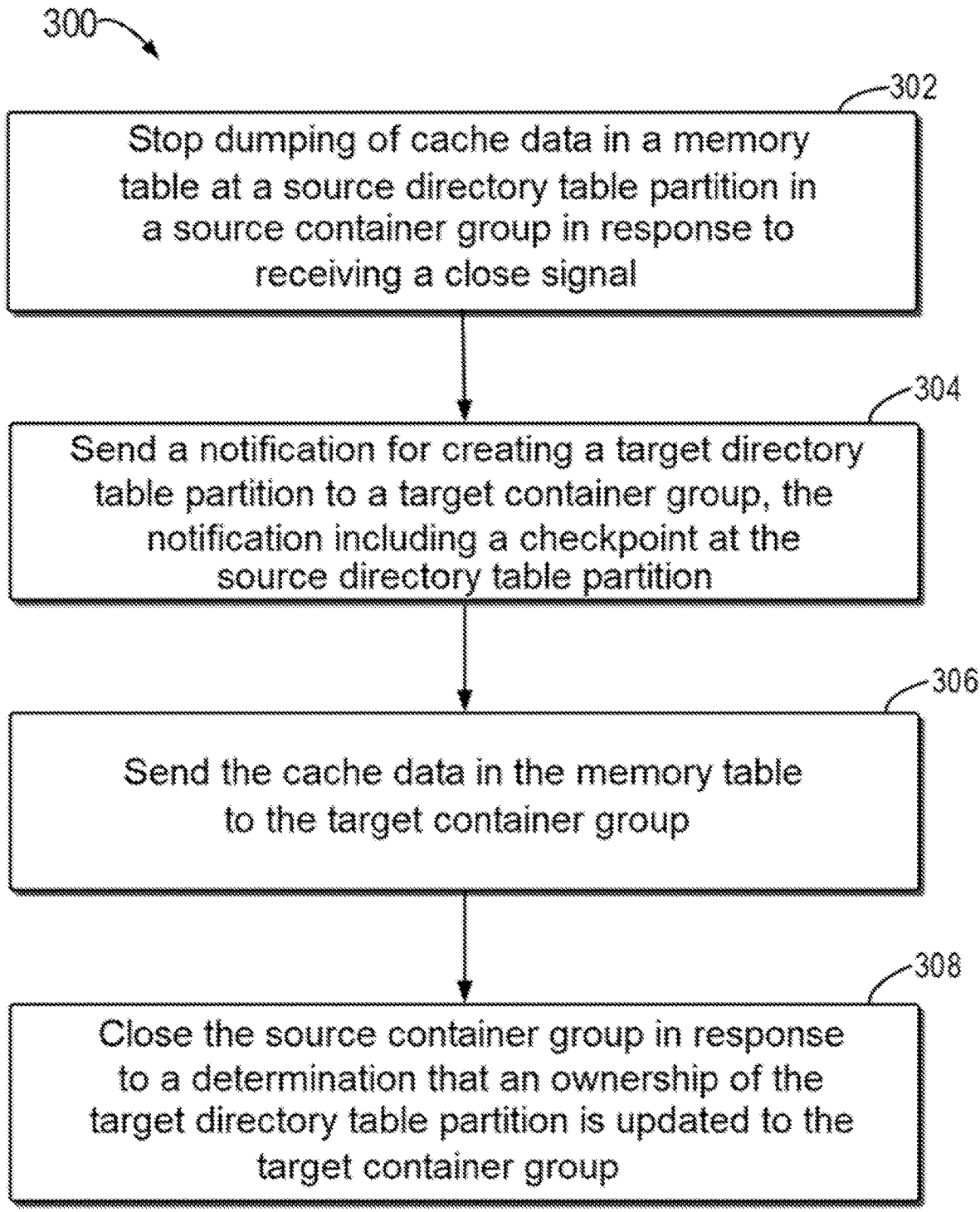
FIG. 3 shows a flowchart of a method for storage according to an embodiment of the present disclosure.

FIG. 3 shows a flowchart of method 300 for storage according to an embodiment of the present disclosure. At 302, in response to receiving a close signal, dumping of cache data in a memory table at a source directory table partition in a source container group is stopped. In some embodiments, after receiving the close signal, the source container group will not be closed directly, and the source directory table partition in the source container group is still in a service state. For example, in the sample container service choreography tool K8S, K8S will send an appropriate graceful close signal to provide time for rescheduling and/or upgrading of the container group. When the close signal is received, the dumping of cache data in the memory table is stopped.

At 304, a notification for creating a target directory table partition is sent to the target container group, the notification including a checkpoint at the source directory table partition. In some embodiments, the target directory table partition is created corresponding to the source directory table partition for storing the same data. For example, when the target container group receives the latest checkpoint, a target directory table partition instance is created, and data on the storage device is loaded through the latest checkpoint.

At 306, the cache data in the memory table is sent to the target container group. For example, the cache data exists in active memory table 204 and/or closed memory table 205 of FIG. 2. In some embodiments, the cache data is sent from the memory table of the source directory table partition to the memory table of the target directory table partition of the target container group.

In 308, the source container group is closed in response to a determination that an ownership of the target directory table partition is updated to the target container group. For example, the ownership of directory table partitions may be updated through a reliable coordination system (for example, ZooKeeper) of the distributed system to ensure that the directory table partitions can provide stable services. In some embodiments, after the source container group is closed, the directory table partitions of the target container group can provide storage services.

Therefore, according to method 300 for storage according to the embodiment of the present disclosure, during the rescheduling and/or upgrading of the source container group, the source container group will not directly stop the service, but will only close the service by receiving an appropriate graceful close signal after migrating the directory table partitions to the target container group. This avoids the interruption time of storage services from being reduced during rescheduling and/or upgrading, and improves the stability of storage services.

Figure 4A:
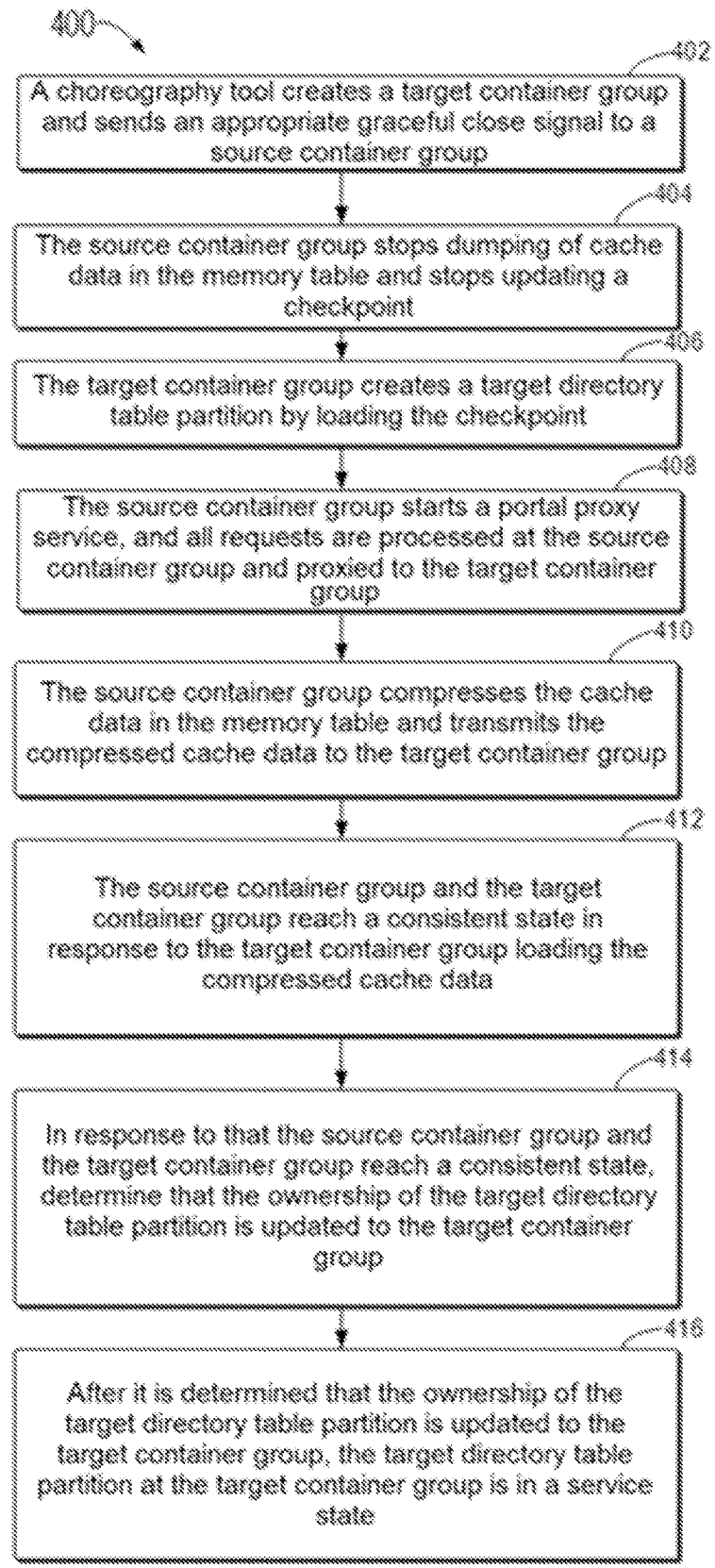
FIG. 4A shows a framework diagram of a method for rescheduling and/or upgrading a source container group according to an embodiment of the present disclosure.
Figure 4B:
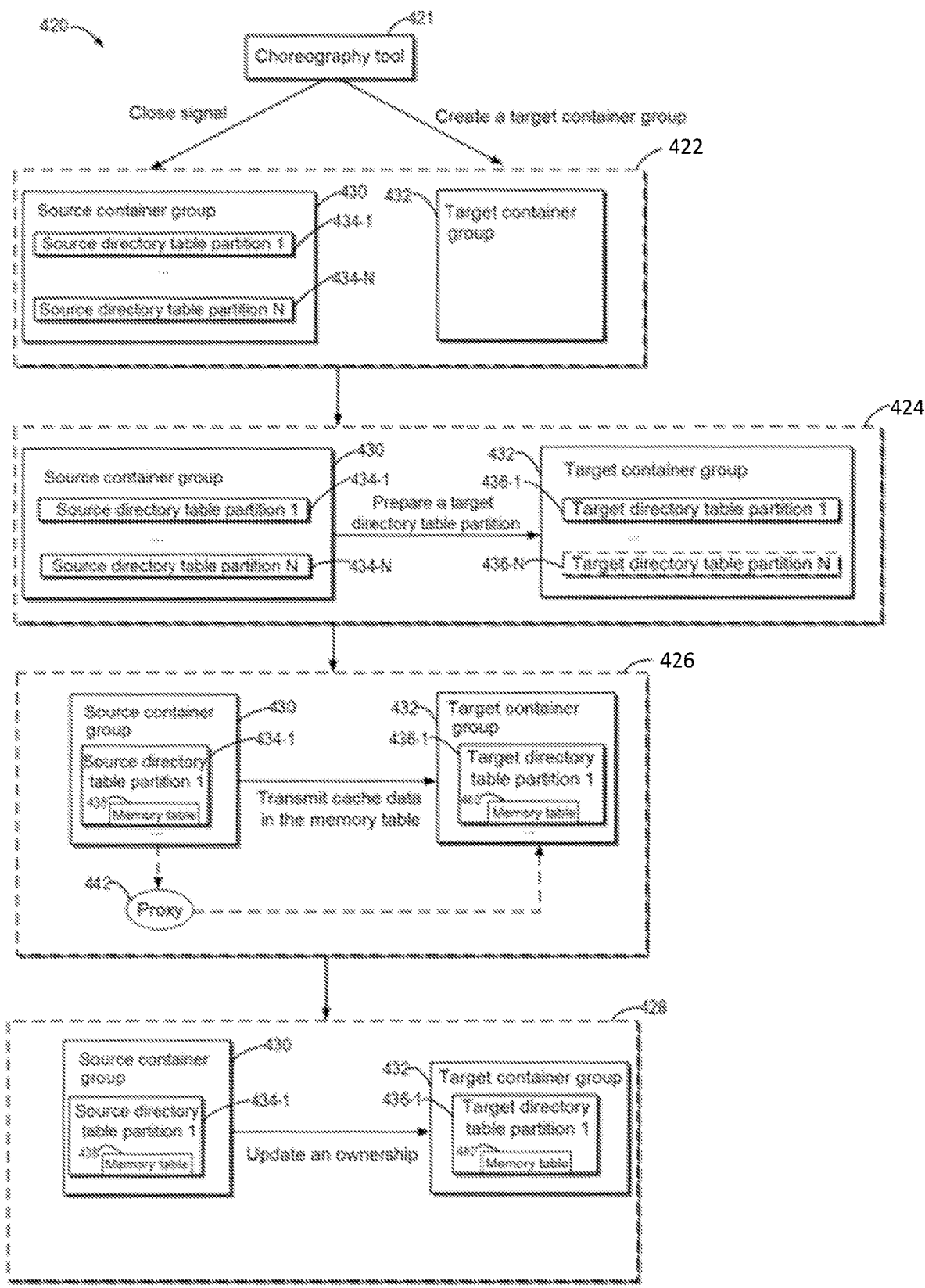
FIG. 4B shows a flowchart of a method for rescheduling and/or upgrading a source container group according to an embodiment of the present disclosure.

FIG. 4A shows a framework diagram of a method for rescheduling and/or upgrading a source container group according to an embodiment of the present disclosure. FIG. 4B shows a flowchart of a method for rescheduling and/or upgrading a source container group according to an embodiment of the present disclosure. The rescheduling and/or upgrading process of the source container group will be described below with reference to FIG. 4A and FIG. 4B.

As shown in FIG. 4A, at 402, a choreography tool creates a target container group and sends an appropriate graceful close signal to a source container group. With reference to FIG. 4B, choreography tool 421 creates target container group 432 in block 422. At this time, target container group 432 does not contain any directory table partition. In addition, choreography tool 421 sends an appropriate graceful close signal to the source container group at block 422. After receiving the close signal, the source container group will not stop a storage service immediately, but will not close until a subsequent operation is completed. For example, after source container group 430 receives the close signal from the choreography tool, source directory table partitions 434-1 to 434-N on the source container group will remain in the service state, which can avoid the interruption of storage services and improve the reliability of the storage services.

As shown in FIG. 4A, at 404, the source container group stops dumping of cache data in the memory table and stops updating a checkpoint. In 406, the target container group creates a target directory table partition by loading the checkpoint. With reference to FIG. 4B, at block 424, target container group 432 creates target directory table partitions 436-1 to 436-N. By loading the latest checkpoint, the data of the target container group and the data of the source container group on the storage device are consistent.

Still referring to FIG. 4A, at 408, the source container group starts a portal proxy service, and all requests are processed at the source container group and proxied to the target container group. With reference to FIG. 4B, at step 426, portal proxy service 442 is started with source container group 430. During the rescheduling and/or upgrade of the source container group, all requests are processed at source container group 430, and are processed at the target container group through portal proxy 442. In some embodiments, the request is written to the memory table at source container group 430, and will further be written to the memory table at the target container group to ensure that the cache data in the memory table of source container group 430 is consistent with the cache data in the memory table of target container group 432 during rescheduling and/or upgrading of the source container group.

As described in FIG. 4A, at 410, the source container group compresses the data in the memory table and transmits the compressed cache data to the target container group. With reference to FIG. 4B, at block 426, source container group 430 compresses the cache data in memory table 438, and transmits the compressed memory table data to target container group 432. In some embodiments, the memory table at the source container group stores some cache data before rescheduling and/or upgrading the source container group, while the memory table at the target container group does not have this part of cache data; therefore, the cache data in the memory table at the source container group must be compressed, and the compressed cache data is sent to the target container group, thereby ensuring that the cache data in the memory table of the source container group is consistent with the cache data in the memory table of the target container group. In some embodiments, the compressed cache data is transmitted over a network.

As shown in FIG. 4A, at 412, the source container group and the target container group reach a consistent state in response to the target container group loading the compressed cache data. Combined with step 406, step 408, and step 410 shown in FIG. 4A above, the data of the source container group and the data of the target container group in the storage device and the memory tables are consistent, and therefore the source container group and the target container group reach a consistent state.

As shown in FIG. 4A, at 414, in response to that the source container group and the target container group reach a consistent state, it is determined that the ownership of the target directory table partition is updated to the target container group. As shown in FIG. 4B, at block 428, the ownership of target directory table 436-1 is updated to target container group 432. In some embodiments, the source directory table partition has the same directory table partition identifier as the target directory table partition, and therefore, the target directory table partition may continue to serve in place of the source directory table partition. In some embodiments, the ownership of the target directory table partition is updated through a reliable coordination system (for example, ZooKeeper) of the distributed system.

As shown in FIG. 4A, at 416, after it is determined that the ownership of the target directory table partition is updated to the target container group, the target directory table partition at the target container group is in a service state, thereby completing the rescheduling and/or upgrading process of the source container group.

In a traditional storage service, the storage service will be interrupted for a long time during container group rescheduling and/or upgrading, that is, a long period of data unavailability. On the one hand, a source container group of the container group to be closed will enter a maintenance mode, and a directory table partition will perform a forced dumping process, which will take a long time. When the directory table partition is moved to a newly created target container group, it will take a long time for the directory table partition to recover a log from the latest checkpoint. In the above method 400, before the target directory table partition at the target container group is in the service state, the source directory table partition at the source container group is always in the service state, which avoids the interruption of storage services and improves the performance of the storage services.

Figure 5:
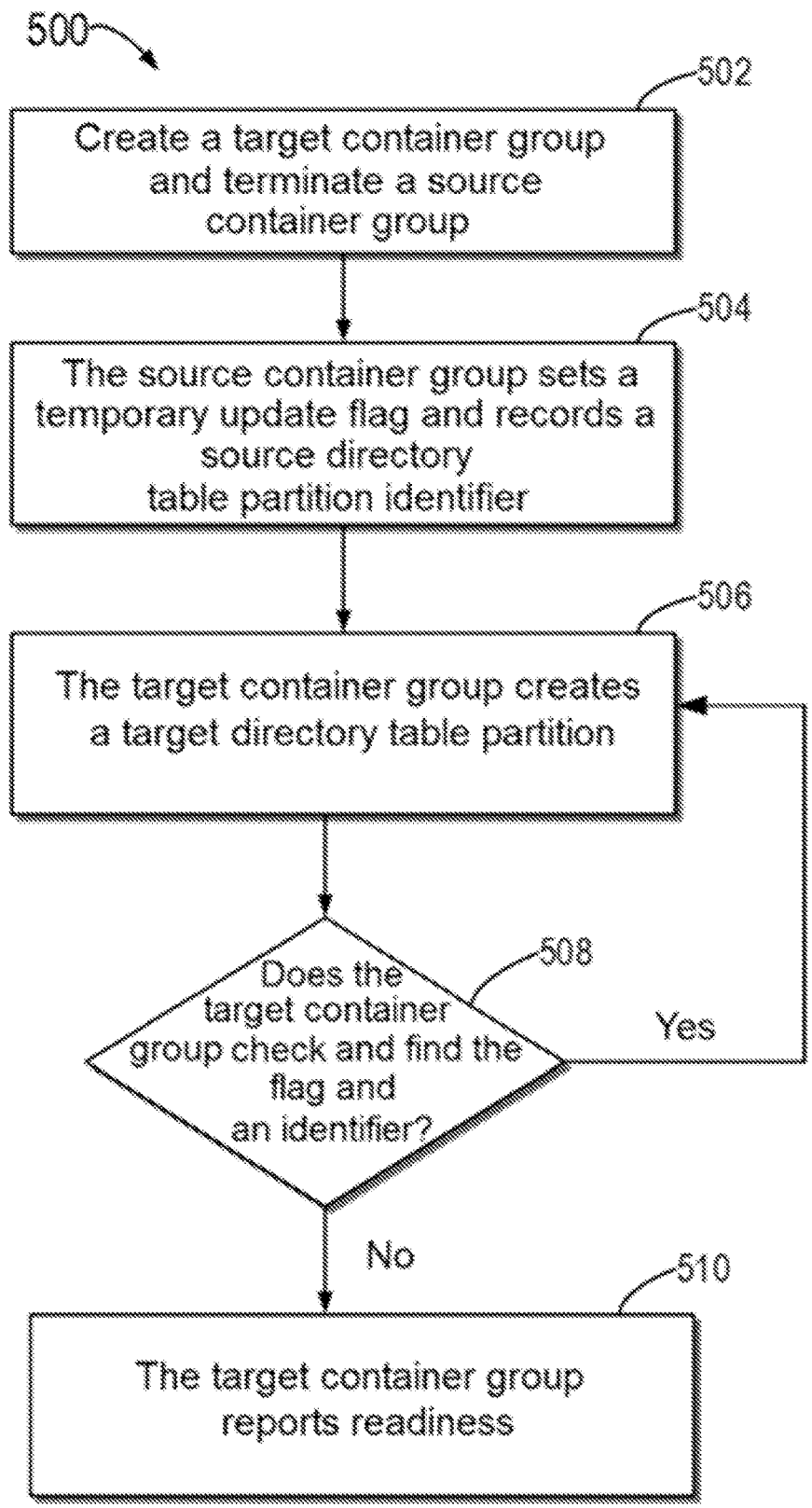
FIG. 5 shows a flowchart of a method for reporting readiness of a target container group in a storage process according to an embodiment of the present disclosure.

FIG. 5 shows a flowchart of method 500 for reporting readiness of a target container group in a storage process according to an embodiment of the present disclosure. As shown in FIG. 5, at 502, a target container group is first created, and a source container group is terminated. At 504, the source container group sets a temporary update flag and records a source directory table partition identifier. In some embodiments, setting a temporary update flag and recording the source directory table partition identifier by the target container group may be implemented through a reliable coordination system (for example, ZooKeeper) of a distributed system.

At 506, the target container group creates a target directory table partition. At 508, the target container group checks to find the temporary update flag and a directory table partition identifier set by the target container group. For example, the target container group checks to find the temporary update flag and the directory table partition identifier set by the target container group, indicating that rescheduling and/or upgrade of the source directory table has not been completed. Therefore, the procedure returns to 506 and continues to create the target directory table partition until the update flag is cleared and all target directory table partitions corresponding to the source directory table partition are created. At 510, the target container group reports readiness. In some embodiments, if another container group needs to be rescheduled and/or upgraded, the procedure returns to 502 to continue execution.

When a common container service choreography tool (for example, kubernetes) checks a ready state of the target container group, it not only reports that the target container group is ready when all directory table partitions of the target container group are ready, but further reports that the target container group is ready when the target container group does not contain any directory table partition. This will cause the target container group to report to the container service choreography tool that it is ready when it does not contain any directory table partition, and the corresponding source container group will be deleted, resulting in the unavailability of the corresponding directory table service. According to above method 500, it is avoided to report that the target container group is ready when the target container group does not contain any directory table partition.

Figure 6:
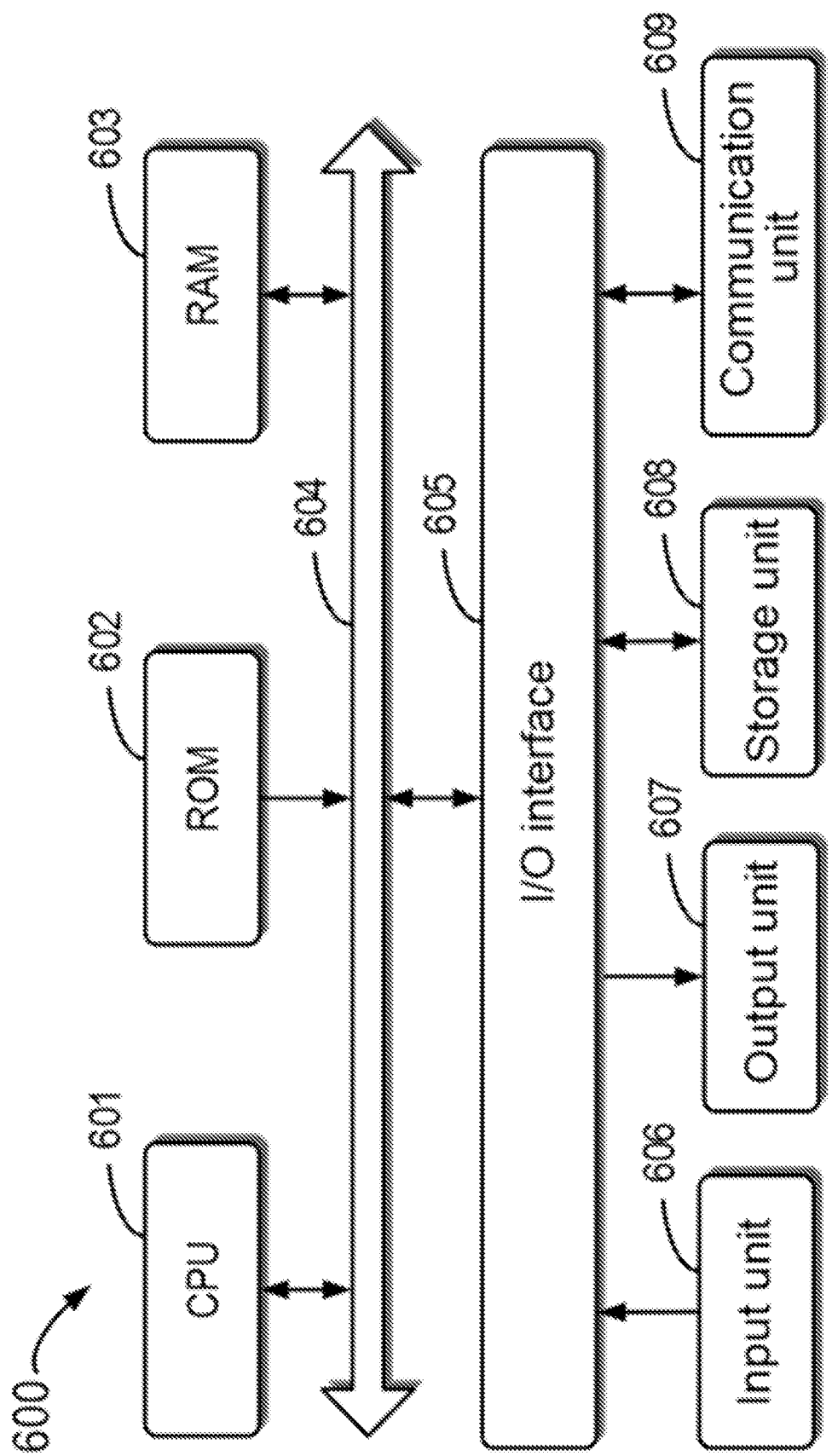
FIG. 6 shows a schematic block diagram of a device that may be used for implementing an embodiment of the present disclosure.

FIG. 6 illustrates a schematic block diagram of device 600 that may be used to implement an embodiment of the present disclosure. Device 600 may be a device or an apparatus as described in embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604. Although not shown in FIG. 6, device 600 may also include a co-processor.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by processing unit 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

What is claimed is:

1. A method, comprising:
   stopping, by a system comprising a processor, dumping of cache data in a memory table at a source directory table partition in a source container group in response to receiving a close signal;
   sending a notification for creating a target directory table partition to a target container group, the notification comprising a checkpoint at the source directory table partition;
   sending the cache data in the memory table to the target container group; and
   closing the source container group in response to a determination that an ownership of the target directory table partition has been updated to the target container group.

2. The method according to claim 1, further comprising:
   in further response to the receiving of the close signal:
   keeping the source directory table partition at the source container group in a service state; and
   stopping updating the checkpoint.

3. The method according to claim 2, wherein the checkpoint is loaded by the target container group to create the target directory table partition.

4. The method according to claim 3, further comprising:
   starting a portal proxy at the source container group after the notification is sent,
   wherein all requests are processed at the source container group and proxied to the target container group.

5. The method according to claim 1, wherein the sending of the cache data in the memory table to the target container group comprises:
   compressing the cache data; and
   sending the compressed cache data to the target container group.

6. The method according to claim 1, wherein the closing of the source container group comprises:
   determining that the ownership of the directory table partition has been updated to the target container group in response to determining that the cache data and checkpoint at the source container group and the cache data and checkpoint at the target container group have reached a consistent state.

7. The method according to claim 1, wherein after determining that the ownership of the directory table partition has been updated to the target container group, the target directory table partition at the target container group is in a service state.

8. The method according to claim 1, wherein the source directory table partition and the target directory table partition have a same directory table partition identifier.

9. The method according to claim 1, further comprising:
   setting an update flag of the source container group, wherein the update flag indicates that the source container group and the source directory table partition are in an updated state.

10. The method according to claim 9, wherein the target container group reports readiness after confirming that the update flag has been cleared.

11. A device, comprising:
    a processing unit; and
    a memory coupled to the processing unit and storing instructions, wherein the instructions, when executed by the processing unit, perform the following actions:
    stopping dumping of cache data in a memory table at a source directory table partition in a source container group in response to receiving a close signal;
    sending a notification for creating a target directory table partition to a target container group, the notification comprising a checkpoint at the source directory table partition;
    sending the cache data in the memory table to the target container group; and closing the source container group in response to a determination that an ownership of the target directory table partition is updated to the target container group.

12. The device according to claim 11, wherein the actions further comprise:
in response to receiving the close signal:
keeping the source directory table partition at the source container group in a service state; and
stopping updating the checkpoint.

13. The device according to claim 12, wherein the checkpoint is loaded by the target container group to create the target directory table partition.

14. The device according to claim 13, wherein the actions further comprise:
starting a portal proxy at the source container group after the notification is sent,
wherein all requests are processed at the source container group and proxied to the target container group.

15. The device according to claim 11, wherein sending the cache data in the memory table to the target container group comprises:
compressing the cache data; and
sending the compressed cache data to the target container group.

16. The device according to claim 11, wherein closing the source container group comprises:
determining that the ownership of the directory table partition is updated to the target container group in response to that the cache data and checkpoint at the source container group and the cache data and checkpoint at the target container group reach a consistent state.

17. The device according to claim 11, wherein after it is determined that the ownership of the directory table partition is updated to the target container group, the target directory table partition at the target container group is in a service state.

18. The device according to claim 11, wherein the source directory table partition and the target directory table partition have the same directory table partition identifier.

19. A computer program product tangibly stored in a non-transitory computer-readable medium and comprising computer-executable instructions, wherein the computer-executable instructions, when executed via a processor, facilitate performance of operations, comprising:
in response to receiving a close signal, stopping dumping of cache data in a memory table at a source directory table partition in a source container group;
sending a notification for creation of a target directory table partition to a target container group, the notification comprising a checkpoint at the source directory table partition;
sending the cache data in the memory table to the target container group; and
in response to a determination that an ownership of the target directory table partition is updated to the target container group, closing the source container group.

20. The computer program product according to claim 19, wherein the operations further comprise:
setting an update flag of the source container group, wherein the update flag indicates that the source container group and the source directory table partition are in an updated state.

* * * * *